United States Patent [19]

Levine

[11] 4,224,386
[45] Sep. 23, 1980

[54] TUBESHEET FOR HOLLOW FIBER TYPE, HIGH TEMPERATURE BATTERY CELLS

[75] Inventor: Charles A. Levine, Clayton, Calif.

[73] Assignee: The Dow Chemical Company, Midland, Mich.

[21] Appl. No.: 58,706

[22] Filed: Jul. 18, 1979

[51] Int. Cl.$^2$ .............................................. H01M 2/14
[52] U.S. Cl. .................................. 429/104; 429/193; 428/398
[58] Field of Search ................ 429/104, 193, 191, 31, 429/102, 101; 428/398; 106/47 R, 54

[56] References Cited

U.S. PATENT DOCUMENTS

| | | | |
|---|---|---|---|
| 3,197,490 | 7/1965 | Nakanishi | 260/397.3 |
| 3,404,035 | 10/1968 | Kummer et al. | 429/104 X |
| 3,413,150 | 11/1968 | Kummer et al. | 429/104 X |
| 3,476,602 | 11/1969 | Brown et al. | 429/104 |
| 3,663,294 | 5/1972 | Levine et al. | 429/104 |
| 3,765,944 | 10/1973 | Taplin | 429/102 |
| 3,791,868 | 2/1974 | Compton et al. | 429/102 X |
| 3,829,331 | 8/1974 | Tsang | 429/104 |
| 4,038,465 | 7/1977 | Ludwig | 429/104 |
| 4,050,915 | 9/1977 | Brown | 264/564 X |

OTHER PUBLICATIONS

E. J. Gooding and W. E. S. Turner, IV. A Study of the Series of Glasses Containing Sodium Oxide, Boric Oxide and Silica, Journal of the Society of Glass Technology, vol. 18, pp. 32–66, 1934.

*Primary Examiner*—Anthony Skapars
*Attorney, Agent, or Firm*—R. R. Stringham

[57] ABSTRACT

A small amount of $SiO_2$ is added to the sodium borate solder glasses of the type previously used to make tubesheets in hollow fiber, high temperature battery cells. The modified glass is more easily ground and has a lower softening temperature. When the powdered glass is fused, to form the tubesheet and sealingly engage the fibers, the fiber-weakening fluxing action of the glass is considerably reduced.

14 Claims, No Drawings

TUBESHEET FOR HOLLOW FIBER TYPE, HIGH TEMPERATURE BATTERY CELLS

BACKGROUND OF THE INVENTION

High temperature battery cells—most notably sodium/sulfur battery cells—in which the electrolyte/separator takes the form of a plurality of cation-permeable hollow fibers or tubules, are now well known. (See, for example, U.S. Pat. Nos. 3,476,602; 3,765,944 and 3,791,868.) In a typical such cell, the electrolyte/separator takes the form of a plurality of generally parallel, $Na^+$ ion-permeable tubules or hollow fiber lengths, each open at one end and closed at the other end. The open ends terminate in the upper surface of a horizontal, disc-like "tubesheet" or wall member, through which the fibers pass in sealing engagement and from the lower surface of which the fibers depend as closed-ended portions.

The tubesheet and fibers constitute a (sub-) assembly which in turn is usually formed as part of a more complex assembly including a carbon-coated aluminum foil disposed below the tubesheet as a spiralled wrap between successive, generally concentric rows of the fibers and extending as a skirt hanging below the closed fiber ends. The space between the successive layers of this skirt is occupied by a relatively thick, aluminum spacer tape. The assembly may also include a central, vertically oriented, aluminum mandrel (tube or rod) extending below the surface formed by the adjacent edges of the skirt and tape, plus several heli-arc weld beads extending radially across the latter surface to the mandrel. (The foil, tape and mandrel function in the finished cell as a current collecting/distributing means.)

An assembly of the latter type may be formed by rolling up (on the mandrel) a wide ribbon of the foil on which the spacer tape and the fiber lengths are appropriately disposed. A bead of a viscous paste of powdered tubesheet glass and a liquid vehicle is extruded at the nip of the developing roll, adjacent to the open fiber ends. The successive, adjacent "wraps" of this bead merge to form a coherent disc which is "green cured" by heating the assembly in vacuo to remove the liquid vehicle. The assembly is then further heated to a temperature, below the distortion temperature of the fibers, at which the glass powder particles fuse together and bond to the fibers.

It is not easy to devise or find a specific tubesheet material which is suitable for use with a given specific fiber material under a particular set of conditions. To be suitable for such use, the candidate material must meet each of some seven different requirements. In a sodium/sulfur battery cell, for instance, the tubesheet material must be inert to (not detrimentally reactive to an intolerable extent with) both sodium and sulfur/sodium polysulfide mixtures, at temperatures of up to at least 325° C. It must also be electronically non-conducting. Further, the candidate material must be reducible to a finely ground powder which, in turn, can be slurried with a readily evaporated or decomposed liquid vehicle to form a viscous, yet extrudeable, paste. In addition, the powder residue left after the vehicle has been removed must have enough coherence to maintain the shape that was imposed on the slurry. The powder must also be fusible, to form a rigid, fluid-tight wall member sealingly bonded to the fibers, at a temperature such that the fibers do not become appreciably distorted in the length of time required to effect the fusion. Finally, the thermal coefficients of expansion of the fiber and tubesheet materials must substantially match, at least over the range of temperatures at which the cells are made, stored and used.

It has now been recognized that still another requirement must be met, if breakage of fibers in tubesheet/fiber assemblies is to be minimized. That is, the tubesheet material should not "flux" the fibers in such manner or to such an extent that they are markedly weakened where they emerge from the tubesheet.

The most satisfactory combination of fiber and tubesheet materials previously found for use in high temperature (Na/S) battery cells was that in which the fibers have compositions essentially as disclosed in U.S. Pat. Nos. 3,829,331 and 4,050,915 and the tubesheet composition is essentially that disclosed in U.S. Pat. No. 3,197,490. Typical such fiber and tubesheet compositions are:

Fibers: $Na_2O$, $2B_2O_3$, $0.16NaCl$, $0.2 SiO_2$
Tubesheet: $Na_2O$, $13.88 B_2O_3$.

A number of reasonably long-lived sodium sulfur cells have been made with the foregoing materials. However, cells of this type often fail prematurely and the apparent cause of failure frequently is breakage of some of the fibers where they emerge from the tubesheet. It is believed that the fibers are embrittled and/or weakened by a fluxing action of the molten tubesheet material during the fusion step. Of course, weakening of the fibers in the foregoing manner also greatly increases the susceptibility of the fibers to breakage during cell assembly.

When an alternative, otherwise suitable, tubesheet material ($Na_2O$, $18.80 B_2O_3$) was employed, similar results were experienced, i.e., the fluxing problem was not solved.

A need for a tubesheet material which meets all of the other requirements listed above, but which does not so severely flux the fibers, is apparent.

The sodium borate tubesheet glasses previously used are soft and quite difficult to adequately grind. The use of special grinding agents and techniques (see the cited U.S. Pat. No. 3,197,490) is required. An easier-to-grind tubesheet material is also highly desirable.

Sodium borosilicate glasses of widely varying proportions of sodium, silicon and boron oxides are well known. However, such glasses are not obvious candidate tubesheet materials. The addition of $SiO_2$ to the sodium borate tubesheet materials might improve their grindability but also would tend to make them more nearly resemble the fiber composition —thereby perhaps increasing, rather than decreasing, the tendency for fluxing to occur.

OBJECTS OF THE INVENTION

The primary object of the invention is to provide an improved tubesheet material which not only meets all the known requirements for hollow fiber type, high temperature battery cells but also has a considerably less deleterious effect on the resistance of the fibers to breakage.

It is also a main object to provide an improved tubesheet/fiber assembly comprising a wall member composed of the latter material.

Another important object is to provide a tubesheet material which is more easily ground but also has a lower softening temperature.

A further object is to reduce the fiber breakage experienced in assembling and operating hollow fiber type, high temperature battery cells.

A corollary object is to provide high temperature, hollow fiber type battery cells in which the fibers have a reduced tendency to break off where they emerge from the tubesheet.

Another object is to provide a more easily assembled, more reliable and more rugged hollow fiber type battery cell.

It is a particular object to provide a hollow fiber type sodium/sulfur battery cell which is improved in the preceding respects.

An additional object is to provide ceramic tubesheet/hollow fiber assemblies of improved utility in applications other than battery cells.

SUMMARY OF THE INVENTION

It has now been found that the foregoing objects can be attained with tubesheet/hollow fiber assemblies in which the tubesheet comprises a wall member composed of sodium borate glass compositions containing up to about 8 mole % of $SiO_2$ and the fibers are of a ceramic material compatible with the tubesheet glass.

The present invention may be more particularly defined as:

a tubesheet/hollow fiber assembly comprising a wall member with which a plurality of hollow fiber lengths passing therethrough are engaged, said wall member consisting essentially of a glass having the composition $Na_2O$, from about 1 to about 6.1 mole %;
$SiO_2$, from about 2.5 to about 7.5 mole %; and
$B_2O_3$, from about 86.5 to about 96.5 mole %; and
said fibers being composed of a ceramic which has a distortion temperature higher than the fusion temperature of said glass, has a thermal coefficient of expansion which—within the range from 25° C. up to its transition temperature—does not differ from that of said glass by more than $10 \times 10^{-7}$ units/°C., and is capable of sealingly bonding with said glass at said fusion temperature without being fluxed by the glass of such an extent that the flex strength of said fibers is reduced by more than 50%.

It should be noted that the foregoing definition is not limited to fluid-impermeable or ion-permeable fibers or to assemblies in which the tubesheet (or wall member) has been "cured" or "fired."

DETAILED DESCRIPTION

Definitions of Terms

The "wall member" specified in the definition of the invention may consist, at one extreme, of discrete particles of the tubesheet glass cohered by secondary bonding forces and mechanical interlocking. At the other extreme, the wall member may be a monolithic body of the glass, formed by particle fusion (or otherwise). Between these extremes, the particles may be fused to each other at edges and points, as by sintering, or may be held together by a minor amount of a cement or adhesive which can be removed prior to the fusion step.

The term "engaged" applies to any interaction between the fibers and the wall member which resists motion of the fibers relative to the wall member (or vice versa).

The specified "hollow fiber lengths" are either linear or are generally U-shaped loops. If they are linear, they may have two open ends, each terminating at or adjacent to the outer face of a different one of two spaced-apart tubesheets, or may have one open end terminating in or adjacent to the outer face of one tubesheet and closed ended portions extending from the inner face thereof. If the fiber lengths are looped, both of their open ends terminate at or adjacent to the outer face of the same tubesheet. (The "inner" face of the tubesheet is that from which the fiber "bundle" depends or extends.)

The term "ceramic" is intended to mean any or all products made from earth by the agency of heat, as glass, enamels, cements, etc.

The term "fluxed" means dissolution, leaching, or swelling of the fibers by the wall-member material or any exchange of ingredients therebetween.

The "flex-strength" of the fibers is the force which must be applied to break off a fiber clamped at one end and free to deflect at the other end, the force being applied at essentially a right angle to the fiber and at a specified distance from the point at which no deflection can occur.

The term "consists essentially of" is intended to mean that the wall member can include such amounts of materials other than those specified as do not result in the loss of the essential character of the sodium borosilicate material to such an extent that at least one of the foregoing objects cannot be realized.

Wall-member Structure and Composition

As indicated above, the wall member may consist essentially of particles (and thus have a porous structure), so long as those particles are sodium borosilicate particles having a composition which can be represented by the formula $Na_2O$, $xSiO_2$, $yB_2O_3$, wherein $x$ and $y$ have values consistent with the mole percent ranges set out in the preceding definition of the invention.

Preferably, the glass from which the wall member is formed has the composition:

$Na_2O$ 1.5–4.5 mole % (~1.9 most preferred)
$SiO_2$ 2.5–4.0 mole % (~2.9 most preferred)
$B_2O_3$ 92–96 mole % (~95.2 most preferred).

As presently contemplated, the utility of such porous wall members is as intermediate structures which can be converted to non-porous, i.e., fluid-tight, unitary wall members which are sealingly engaged with the fibers.

The sodium borosilicate particles may include dissolved incidental impurities and small amounts of other materials may be present within the interstices between the particles or on their surfaces. Those of the latter materials which are insoluble in the tubesheet glass are of less concern but those which are soluble may have a greater effect on the critical balance of properties which is essential to the functioning of the wall member material during, and after, the fusion step. Consequently, the total amount of soluble impurities which can be tolerated will usually not exceed a few tenths of a percent (by weight). Preferably, the content of materials other than the specified borosilicate glass is no more than about a tenth of a percent.

Slurry Preparation

When the wall member is to be formed from a slurry, the solids to liquid ratio in the slurry should be as high as possible, in order to minimize the shrinkage achieved upon fusion of the liquid-free particles. This is done by adjusting the particle size distribution of the glass powder used, according to known principles of particle packing. Some of the powder particles must have effective diameters of less than 10 microns. (Preferably, most of the particles have diameters of less than 2 microns and at least 20% of them are less than 1 micron in diameter.) From about 40 to about 60 parts by weight of the powdered glass is mixed with about 60 to about 40 parts of $-140$ to $+325$ mesh particles of the same (or a different) sodium borosilicate glass (as specified earlier herein). Preferably, the latter particles are at least generally spherical in shape, to improve the extrudeability of the slurried mixture.

If the preceding particle mixture is mixed in turn with from about 7 to about 14 parts by weight of a (volatilizeable) non-aqueous, liquid suspending vehicle, such as— for example—cumene, the resulting slurry is fluid enough to be readily extrudeable but viscid enough to hold the shape imposed on it until a complete wall member can be formed and "green cured" (free of volatiles).

The grinding method disclosed in the above-cited U.S. Pat. No. 3,197,490 is quite suitable for the production of the sodium borosilicate glass powder employed in the practice of the present invention. However, considerably shorter grinding times are required for these glasses than for the sodium borate tubesheet glasses previously used. (See Example 2, herein.)

Fibers Composition and Preparation

The fibers employed in the present invention can consist of any otherwise suitable material which can be fabricated in hollow fiber form and meets the requirements set forth in the preceding definition. If the fibers are to be employed in a high temperature battery cell, they must also be substantially ion-permeable, at least at the normal working temperature contemplated for that cell. When employed in alkali metal/chalcogen cells, the fibers should be sufficiently permeable to cations of the alkali metal that the overall, internal electrical resistance of the cell (at its normal operating temperature) is acceptably low, for the particular cell use contemplated.

The most important application of the present invention now known of is in sodium/sulfur battery cells. For this purpose, the fibers necessarily are permeable to $Na^+$ ions and should have the following properties: distortion temperature at least 340° C., thermal coefficient of expansion within the range of from about 100 to about $130 \times 10^{-7}$ units per °C. and electrical ($Na^{30}$) conductivity of at least $5 \times 10^5$ ohm cm at a temperature of from about 280° to about 325° C.

The material used to make the fibers of course must be processable in some manner to form the fibers in the first place. The only known practicable method of fabricating ceramic hollow fibers (which typically are hair-like and fragile) is by melt spinning, essentially in the manner disclosed in the above cited 4,050,915 patent.

Materials having the compositions disclosed in the latter patent and the above cited U.S. Pat. No. 3,829,331 generally suitable for the preparation of hollow fibers to be employed in Na/S battery cells. The preferred materials for such fibers have the following composition:

$Na_2O$    25–34 mole %
$B_2O_3$   50–66 mole %
$SiO_2$    0–11 mole %
NaCl       0–6 mole %

A more preferred composition for the latter fibers is:

$Na_2$     29.0–30.5 mole % (~29.8% most preferred)
$B_2O_3$   58–60 mole % (~59.5% most preferred)
$SiO_2$    5.5–6.5 mole % (~5.9% most preferred)
NaCl       4.5–5.5 mole % (~4.8% most preferred).

Because quite small amounts of impurities can markedly alter the ionic conductivity of the fiber material, the requirements in this regard for battery cell fibers are even more stringent than for the wall member material. In general, materials of the foregoing composition which include more than about 0.5% by weight of impurities should not be used for the preparation of battery cell fibers; preferably, the impurities content is less than 0.1% by weight.

As will be apparent to those knowledgeable in the art, the requirements for fibers to be employed in types of devices other than battery cells will differ in some respects. Thus, if the fibers are to be employed, in a permeability separatory device, as a membrane resistant to high temperatures and/or corrosive materials, they need not be ion-conductive but will have to be selectively permeable to at least one of the materials to be separated. Similarly, fibers of the latter type (or microporous ceramic fibers) may be advantageously utilized for the introduction to a first fluid stream of a second fluid, as in sparging a gas into a liquid under severe conditions. (Ceramic (glass) fibers adapted to applications of the foregoing types are known; see, for example, Nimelnyk and H. B. Habgood, "Extraction of Helium From Natural Gas. The Diffusion Through Glass Process," Annual Meeting, Petrol. & Nat. Gas Division, Edmonton, May, 1960; *Canadian Mining & Metallurgical Bulletin* for October, 1961; Montreal, Canada, pp. 768–774).

Selection of Tubesheet and Fiber Material Pairs

In selecting the wall member and fiber materials for a given application, it will generally be essential that the match between their thermal coefficients of expansion be such that the assembly can be cooled down, after the fusion step, without fibers breaking or cracks developing in the wall member. However, this does not necessarily require that as close a match as possible be attained. The maximum tolerable extent of mismatch for a given, specific application of course can be determined, by well known methods, without undue experimentation.

The following tabulation is indicative of the effect of compositional differences on the thermal coefficient of expansion for sodium borate/borosilicate glasses. (Softening points and glass transition temperature are also given for some of the glasses).

TABLE I

EFFECT OF COMPOSITION OF THERMAL COEFFICIENT OF EXPANSION

| Glass | Composition Mole %'s | | | | | | Coef. Units/°C. | Temp. Range °C. | Trans. Temp. °C. | Softening Temp. °C. |
|---|---|---|---|---|---|---|---|---|---|---|
| | $Na_2O$ | $B_2O_3$ | $SiO_2$ | NaCl | NaF | $MgF_2$ | | | | |
| a | 0 | 100 | 0 | 0 | 0 | 0 | 153 × 10 | | | |
| b | 0 | 95.2 | 5.8 | 0 | 0 | 0 | 134 | | | |
| c | 0 | 88.5 | 11.5 | 0 | 0 | 0 | 118 | | | |
| d | 1.9 | 95.2 | 2.9 | 0 | 0 | 0 | 116 | 0–130 | 250 | 325 |

TABLE I-continued

EFFECT OF COMPOSITION OF THERMAL COEFFICIENT OF EXPANSION

| Glass | Composition Mole %'s | | | | | | Coef. Units/°C. | Temp. Range °C. | Trans. Temp. °C. | Softening Temp. °C. |
|---|---|---|---|---|---|---|---|---|---|---|
| | Na$_2$O | B$_2$O$_3$ | SiO$_2$ | NaCl | NaF | MgF$_2$ | | | | |
| | | | | | | | 130 | 130-250 | | |
| e | 3.9 | 92.8 | 3.3 | 0 | 0 | 0 | 120 | 25-250 | 310 | 328 |
| f | 5.1 | 94.9 | 0 | 0 | 0 | 0 | 119 | | | 340 |
| g | 5.6 | 94.4 | 0 | 0 | 0 | 0 | 127 | | | |
| h | 6.7 | 93.3 | 0 | 0 | 0 | 0 | 111 | | | 350 |
| i | 11.1 | 88.9 | 0 | 0 | 0 | 0 | 100 | | | |
| j | 15.0 | 79.8 | 5.2 | 0 | 0 | 0 | 101 | | | |
| k | 16.6 | 83.4 | 0 | 0 | 0 | 0 | 83 | 0-130 | | |
| | | | | | | | 95 | 130-250 | | |
| l | 29.5 | 58.9 | 0 | 0 | 8.7 | 2.9 | 137 | 0-300 | | 492 |
| m | 29.8 | 59.5 | 5.9 | 4.8 | 0 | 0 | 124 | 0-300 | | |

The following examples are for purposes of illustration and are not to be construed as limiting the present invention in a manner inconsistent with the claims appended to these specifications.

EXAMPLES

Example 1: Glass Preparation

A quantity of glass d (Table I) was prepared from Na$_2$CO$_3$ (2.99 parts by weight), B$_2$O$_3$ (95.76 parts) and SiO$_2$ (2.48 parts) by mixing the powdered ingredients in a rolling jar for about 1/2 hour, melting the resulting powder mixture, maintaining the melt at a temperature of ~1000° C. for two hours while stirring it at intervals of about 40 minutes (average) and letting it solidify. This glass was found to have the properties given for it in Table I.

Example 2: Preparation of Fiber/tubesheet Assembly

A billet of glass e (Table I) was prepared in the manner of Example 1, broken up and "rough" ball milled. The −325 mesh portion of the milled glass was screened out and ground (essentially in the manner disclosed in U.S. Pat. No. 3,917,490) with 1.5 wt. % of n-decylamine in a ball mill, at 90° C., for 3 days. The resulting powder, when mixed with an equal weight of −140+325 mesh spherical particles of the same composition as the powder and then with 10% by weight of cumene yielded a more easily extruded paste than is obtained with otherwise essentially identical mixtures, the glass powder component of which has been made by ball milling either of the prior art glasses f or h (Table I) in the same way for 7-10 days.

A quantity of hollow fiber, 50 μI.D. by 80 μO.D., was spun, essentially as described in U.S. Pat. No. 4,050,915 from glass m (Table I). A tubesheet/fiber assembly of the type used in experimental 6 ampere hour Na/S battery cells was constructed in the manner described earlier herein, using about 3000, 10 cm lengths (closed at one end) of the fiber. When this assembly was heated for 4 hours at 372°-3° C., the "green" tube sheet was "cured" to a unitary disc about 2 cm in diameter and 0.4 cm thick. The assembly was found (as described below) to be helium-tight and the fibers were found not to have been substantially weakened or embrittled. In contrast, otherwise essentially identical assemblies prepared from the prior art tubesheet glasses (f or h, Table I) must be fused ("cured") at temperatures in the range of from about 383°-405° C. in order to be made helium-tight and the fibers become quite brittle where they emerge from the lower surface of the wall member.

The method used to check the assembly for tubesheet cracks, broken fibers and/or imperfect fiber/tubesheet bonding is as follows. A commercial helium detector (A Varian, Model 925-40, mass spectrograph unit which can detect helium flows as small as $10^{-9}$ c.c. (S.T.P.) per second) is connected to the stem of an inverted funnel which is sealingly engaged with the periphery of the wall member and helium gas is discharged just below the wall member, at about the center of the fiber bundle (which ordinarily is formed around a hollow mandrel which conveniently functions as a conduit for the helium). The helium flows radially outward between the fibers and across the lower face of the wall member. If the rate of helium flow through the detector is so low ($<10^{-9}$ c.c/sec.) as not to be detectable, the assembly is considered leak-free. (A typical helium flow when a leak results from imperfect bonding between the wall member and a single fiber is about $10^{-7}$ c.c./second.)

Example 3: Retention of Fiber Strength

The extent to which fibers of a specific size and composition are weakened when "potted" in a specific tubesheet glass can be determined (within statistically assessed confidence limits) by means of the following procedure—which should be carried out in a reproducible, controlled environment, such as is afforded by a dry box or dry room.

A 1 cm diameter hole is drilled through a 1.5 cm thick cylindrical test block of a material which does not soften at the glass cure temperature and has a thermal coefficient of expansion which is the same as or not more than $20\times10^{-7}$ units/°C. greater than that of the glass. The block has a flat lower face (to which the axis of the hole is perpendicular) and is closely fitted in a flat-bottomed cylindrical cavity in a tapered TEFLON® stopper. A hole somewhat larger in diameter than the fiber to be tested is drilled through the stopper along the same axis as the hole in the test block. The stopper is tightly inserted in the mouth (a tapered, ground glass female joint) of a test tube having a side arm. A length of the fiber, having one end closed, is inserted in the test tube through the small hole until its closed end rests on the test tube bottom and the open end of the fiber extends above the upper surface of the test block. A source of vacuum is connected to the side arm of the test tube and the fiber portion in the test block is "potted" by filling the space around it (the hole in the block) with the same viscous paste of glass particles and liquid vehicle as is used in preparing tubesheets. (A syringe is convenient for the latter operation). An inverted funnel is fitted over the block and stopper assembly, sealingly engaged with the outer surface of the test tube (by means of a gasket) and connected to the same vacuum source as the side arm. The vacuum is gradually increased while the assembly is slowly warmed, to remove the liquid component of the paste. The potting material has now been "green cured." The vacuum source is disconnected and air allowed to bleed slowly into the assembly. The funnel is disengaged from the test tube and the test block and fiber carefully removed from the stopper and test tube.

The block, fiber and potting material are now heated in the same manner employed when preparing tubesheets from the glass, thereby "curing" the potting material (i.e., forming a unitary "wall member" sealingly engaged with the fiber). If desired, the bottom of the wall member can be examined with a microscope and/or the assembly tested for leaks as described in Example 2.

The block is clamped in a suitable jig with the closed-ended portion of the fiber extending down at an angle to the horizontal and tangentially contacting the bottom of an endless groove in the periphery of a small TEFLON® wheel spaced an arbitrary distance from the test block. The vertical position of the wheel is adjusted until the portion of the fiber between the block and the wheel appears to be essentially straight. The distance from the block to the wheel and the angle to the horizontal made by the fiber are measured. The wheel is then gradually raised, along a rectilinear or arced path, as appropriate, until the fiber breaks.

Another, essentially identical, length of the fiber is tested in the same way, except that the potting material used is a comparably viscous resin which is inert to the fiber material and is readily cured to a hard, inflexible material. The ratio of the first distance the wheel has to be moved to break the fiber to the second distance is taken as a measure of the extent to which the fiber retains its strength when the tubesheet glass is fused around it. Of course, a better indication of strength retention is obtained by testing several fiber lengths potted with the tubesheet glass (or the resin) but contacting the wheel at different initial distances from the test block, and plotting the respective ratios against the latter distances.

When the foregoing test is carried out on individual fibers which meet the requirements set forth earlier herein and are potted with tubesheet glasses having the composition specified herein, substantially better strength retention is observed, as compared to the same kind of fibers potted in the prior art glasses (glasses f and h, Table I, for example). By "substantially better" is meant consistently greater than 50% retention (usually greater than 70%), as compared to consistently less than 50% (usually less than 40%).

What is claimed is:

1. A tubesheet/hollow fiber assembly comprising a wall member with which a plurality of hollow fiber lengths passing therethrough are engaged,
    said wall member consisting essentially of a glass having the composition
    $Na_2O$, from about 1 to about 6.1 mole %;
    $SiO_2$, from about 2.5 to about 7.5 mole %; and
    $B_2O_3$, from about 86.5 to about 96.5 mole %; and
    said fibers being composed of a ceramic which
    has a distortion temperature higher than the fusion temperature of said glass,
    has a thermal coefficient of expansion which within the range from 25° C. up to its transistion temperature—does not differ from that of said glass by more than $10 \times 10^{-7}$ units/°C., and
    is capable of sealingly bonding with said glass at said fusion temperature without being fluxed by the glass to such an extent that the flex strength of said fibers is reduced by more than 50%.

2. An assembly as in claim 1 in which the walls of said fibers are ion-permeable.

3. An assembly as in claim 2 wherein said ions are cations of an alkali metal.

4. The assembly of claim 3 in which said alkali metal is sodium and said fibers have a distortion temperature of at least 340° C., a coefficient of thermal expansion within the range of from about 100 to about $130 \times 10^{-7}$ units/°C. and an electrical conductivity of at least $5 \times 10^{-5}$ ohm cm at a temperature within the range of from about 280° C. to about 325° C.

5. An assembly as in claim 4 in which said fibers consist essentially of a ceramic having the composition:
    $Na_2O$   25–34 mole %
    $B_2O_3$   50–60 mole %
    $SiO_2$    0–11 mole %
    $NaCl$    0–6 mole %.

6. An assembly as in claim 5 wherein said ceramic has the composition:
    $Na_2O$   29.0–30.5 mole %
    $B_2O_3$   58–60 mole %
    $SiO_2$    5.5–6.5 mole %
    $NaCl$    4.5–5.5 mole %.

7. An assembly as in claim 6 wherein said ceramic has the composition:
    $Na_2O$ about 29.8 mole %
    $B_2O_3$ about 59.5 mole %
    $SiO_2$ about 5.9 mole %
    $NaCl$ about 4.8 mole %.

8. An assembly as in claim 1 wherein said glass has the composition:
    $Na_2O$   1.5–4.5 mole %
    $B_2O_3$   92–96 mole %
    $SiO_2$    2.5–4.0 mole %.

9. An assembly as in claim 5 wherein said glass has the composition specified in claim 8.

10. An assembly as in claim 9 wherein said glass has the composition:
    $Na_2O$ about 1.9 mole %
    $B_2O_3$ about 95.2 mole %
    $SiO_2$ about 2.9 mole %.

11. An assembly as in claim 1 in which said glass is in the form of particles and said wall member is porous.

12. An assembly as in claim 1 in which said wall member is a unitary body of said glass and is sealingly engaged with said fibers.

13. An assembly as in claim 9 in which said wall member is a unitary body of said glass and is sealingly engaged with said fibers.

14. An assembly as in claim 10 in which said wall member is a unitary body of said glass and is sealingly engaged with said fibers.

* * * * *

UNITED STATES PATENT AND TRADEMARK OFFICE
CERTIFICATE OF CORRECTION

PATENT NO. : 4,224,386
DATED : September 23, 1980
INVENTOR(S) : Charles A. Levine It is certified that error appears in the above—identified patent and that said Letters Patent is hereby corrected as shown below:

Column 3, line 44, "of" should be -- to --;

Column 5, line 48, "$(Na^{30})$" should be -- $(Na^+)$ --;

Column 6, line 57, "temperature" should be plural;

Column 6, Table I, after the word "Composition" in the sub-title the word should be -- ON -- rather than "OF";

Column 6, Table I, in group a, in the column "Coef. Units/°C." an exponent of -7 should be shown, i.e., -- $153 \times 10^{-7}$ --;

Column 7, Table I, the sub-title is again incorrect as in Column 6;

Column 10, line 3, a dash has been left out between "which" and "within".

Signed and Sealed this

Seventeenth Day of March 1981

[SEAL]

Attest:

RENE D. TEGTMEYER

Attesting Officer     Acting Commissioner of Patents and Trademarks